United States Patent
Balbo Block et al.

(10) Patent No.: US 8,940,803 B2
(45) Date of Patent: Jan. 27, 2015

(54) WATER-BLOWN RIGID FOAMS WITH IMPROVED MECHANICAL PROPERTIES AT LOW TEMPERATURES

(75) Inventors: Marco Balbo Block, Osnabrueck (DE); Cheul Hyeon Hwang, Daejeon (KR)

(73) Assignee: BASF SE, Ludwigshafen (DE)

( * ) Notice: Subject to any disclaimer, the term of this patent is extended or adjusted under 35 U.S.C. 154(b) by 634 days.

(21) Appl. No.: 13/139,138

(22) PCT Filed: Dec. 3, 2009

(86) PCT No.: PCT/EP2009/066330
§ 371 (c)(1),
(2), (4) Date: Jun. 10, 2011

(87) PCT Pub. No.: WO2010/066635
PCT Pub. Date: Jun. 17, 2010

(65) Prior Publication Data
US 2011/0251297 A1 Oct. 13, 2011

(30) Foreign Application Priority Data
Dec. 10, 2008 (EP) ..................................... 08171232

(51) Int. Cl.
*C08G 18/28* (2006.01)
*C08G 18/42* (2006.01)
*C08G 18/40* (2006.01)
*C08G 18/48* (2006.01)
*C08G 18/66* (2006.01)
C08G 101/00 (2006.01)

(52) U.S. Cl.
CPC ........ *C08G 18/4211* (2013.01); *C08G 18/4018* (2013.01); *C08G 18/4804* (2013.01); *C08G 18/4829* (2013.01); *C08G 18/6674* (2013.01); C08G 2101/0025 (2013.01); C08G 2101/0058 (2013.01); C08G 2101/0083 (2013.01); C08G 2390/00 (2013.01)
USPC .......................................... 521/173; 521/130

(58) Field of Classification Search
CPC ............... C08G 18/32; C08G 18/4018; C08G 18/4211; C08G 18/4804; C08G 18/4829; C08G 18/6674; C08G 2101/0025; C08G 2101/0058; C08G 2101/0083; C08G 2390/00; C08J 9/08
USPC ................................................... 521/130, 173
See application file for complete search history.

(56) References Cited

U.S. PATENT DOCUMENTS

| | | | |
|---|---|---|---|
| 3,319,431 A | 5/1967 | Clarke et al. | |
| 3,341,050 A | 9/1967 | Forman et al. | |
| 5,478,494 A * | 12/1995 | Lee et al. | 252/182.25 |
| 5,770,635 A | 6/1998 | Lee et al. | |
| 5,798,533 A * | 8/1998 | Fishback et al. | 252/182.25 |
| 6,284,811 B1 * | 9/2001 | Sawai et al. | 521/159 |
| 6,284,812 B1 | 9/2001 | Rotermund et al. | |
| 6,660,782 B1 * | 12/2003 | Matijega | 521/130 |
| 8,530,533 B2 * | 9/2013 | Lehmann et al. | 521/99 |
| 2005/0115248 A1 | 6/2005 | Koehler et al. | |
| 2007/0015842 A1 | 1/2007 | Moerman et al. | |
| 2007/0232712 A1 * | 10/2007 | Emge et al. | 521/176 |

FOREIGN PATENT DOCUMENTS

| | | |
|---|---|---|
| DE | 197 42 012 | 3/1999 |
| EP | 1 698 649 | 9/2006 |
| JP | 2001 150558 | 6/2001 |
| JP | 2003 240198 | 8/2003 |
| KR | 2000 0010021 | 2/2000 |
| KR | 2000 0010022 | 2/2000 |
| WO | 2008 083996 | 7/2008 |

OTHER PUBLICATIONS

International Search Report Issued Feb. 1, 2010 in PCT/EP09/066330 filed Dec. 3, 2009.

* cited by examiner

*Primary Examiner* — John Cooney
(74) *Attorney, Agent, or Firm* — Oblon, Spivak, McClelland, Maier & Neustadt, L.L.P.

(57) ABSTRACT

The present invention relates to a rigid polyurethane foam which can be obtained by mixing (a) isocyanates, (b) compounds having groups which are reactive toward isocyanates, (c) blowing agents comprising water, (d) catalysts and optionally (e) further additives to form a reaction mixture, applying the reaction mixture to a reinforcing material and curing the reaction mixture, where the isocyanates (a) have a viscosity of not more than 500 mPas at 25° C. and the compounds (b) having groups which are reactive toward isocyanates comprise a polyetherol (b1) having a functionality of 4 or more and a viscosity at 25° C. of 10 000 mPas or less, a polyetherol (b2) having a functionality of 3.5 or less and a viscosity at 25° C. of 600 mPas or less, a polyesterol (b3) having a viscosity at 25° C. of 2000 mPas or less, chain extenders (b4) comprising at least 30% secondary OH groups and optionally a crosslinker (b5). The present invention further relates to a process for producing such rigid polyurethane foams and the use of the rigid polyurethane foams for the insulation of liquefied natural gas tanks.

19 Claims, No Drawings

WATER-BLOWN RIGID FOAMS WITH IMPROVED MECHANICAL PROPERTIES AT LOW TEMPERATURES

The present invention relates to a rigid polyurethane foam which can be obtained by mixing (a) isocyanates, (b) compounds having groups which are reactive toward isocyanates, (c) blowing agents comprising water, (d) catalysts and optionally (e) further additives to form a reaction mixture, applying the reaction mixture to a reinforcing material and curing the reaction mixture, where the isocyanates (a) have a viscosity of not more than 500 mPas at 25° C. and the compounds (b) having groups which are reactive toward isocyanates comprise a polyetherol (b1) having a functionality of 4 or more and a viscosity at 25° C. of 10 000 mPas or less, a polyetherol (b2) having a functionality of 3.5 or less and a viscosity at 25° C. of 600 mPas or less, a polyesterol (b3) having a viscosity at 25° C. of 2000 mPas or less, chain extenders (b4) comprising at least 30% secondary OH groups and optionally a crosslinker (b5). The present invention further relates to a process for producing such rigid polyurethane foams and the use of the rigid polyurethane foams for the insulation of liquefied natural gas tanks.

Further embodiments of the present invention are described in the claims, the description and the examples. It goes without saying that the features mentioned above and features still to be explained below of the subject matter of the invention can be used not only in the combination indicated in each case but also in other combinations without going outside the scope of the invention.

Apart from petroleum, natural gas is one of the most important energy sources of our time. However, to bring the gas from the sources to the customers, it usually has to be transported over great distances. This is achieved, for example, via pipelines. However, the transport of natural gas via pipelines to outlying areas or over very large distances is very expensive. In addition, the political situation in some countries may make it impossible to lay such pipelines through them. In such cases, transport by sea in natural gas tankers (known as liquefied natural gas (LNG) carriers) is frequently chosen as an alternative. For this purpose, the natural gas is liquefied on land and placed in enormous tanks on board ships. Since natural gas can only be liquefied at very low temperatures of about −160° C. and also has to be stored and transported at these temperatures, it is necessary to insulate the tanks, especially on board ships, as well as possible in order to keep the loss of liquefied gas by evaporation low.

As insulation material, use is made primarily of rigid polyurethane foams because of their excellent insulating properties compared to other insulation materials such as polystyrene foam or mineral wool.

The overall construction of insulation in liquefied natural gas carriers is extremely complex. Thus, the insulation of the tanks not only has to prevent evaporation of natural gas but also has to give the tanks a certain degree of stability. Thus, apart from rigid polyurethane foam, use is made of, for example, plywood, fiberglass and stainless steel layers to stabilize the tanks.

The actual tanks comprise mainly a very thin barrier layer of stainless steel, so that the insulation structure provides a major part of the required stability. The rigid polyurethane foam which is mostly used thus has quite a high density. Furthermore, it preferably comprises reinforcing materials, usually glass fiber mats (CSMs—continuous strand mats), which provide the necessary mechanical properties. In order for the optimal stability to be able to be ensured, uniform distribution of these continuous strand mats over the total thickness of the foam is an important parameter.

Such insulation structures are described, for example, in the Korean patent texts KR 2000010021 and KR 2000010022, the Japanese patent texts JP 2003240198 and JP 2001150558, the US patent texts US 20050115248, U.S. Pat. No. 3,319,431 and U.S. Pat. No. 3,341,050, the European patent application EP 1698649 and the international patent application WO 2008083996.

In the case of rigid foams which are subjected to large temperature differences and temperature changes, shear forces occur within the foam body. Since the polyurethane foam is a thermal insulator, a temperature gradient arises in the foam body, resulting in a shrinkage/expansion gradient which in turn leads to shear forces within the foam body. Shear strength is also an important property for rigid foams which are subjected to transverse stresses, as occur, for example, on ships carrying a liquid load. For this reason, rigid polyurethane foams which are used for the insulation of tanks for liquefied natural gas have to have not only good mechanical properties such as compressive strength and a compressive modulus of elasticity (Young's modulus) but also a particularly high shear strength.

As blowing agents, use is usually made of halogenated blowing agents such as chlorofluorocarbons and fluorinated hydrocarbons, since foams having a particularly low thermal conductivity are obtained in this way. However, chlorofluorocarbons are responsible for destruction of the ozone layer and both chlorofluorocarbons and fluorinated hydrocarbons are gases which contribute to global warming. For these reasons, alternatives have to be sought.

Blowing agents such as hydrocarbons, for example pentane, are not particularly suitable because of their flammability.

If physical blowing agents such as fluorinated hydrocarbons are replaced by chemical blowing agents such as water, there is increasing formation of urea groups in the finished foam, as a result of which the foam becomes more brittle, especially at low temperatures, and the shear strength decreases.

It was an object of the invention to provide a rigid polyurethane foam which is suitable for the insulation of liquefied natural gas tanks on board ships, in which the chlorofluorocarbons or fluorinated hydrocarbons used as blowing agents have been entirely or partly replaced by alternative blowing agents and which has very good mechanical properties such as compressive strength, compressive modulus of elasticity and shear strength and also a low thermal conductivity.

This object was achieved by a rigid polyurethane foam which can be obtained by mixing (a) isocyanates, (b) compounds having groups which are reactive toward isocyanates, (c) blowing agents comprising water, (d) catalysts and optionally (e) further additives to form a reaction mixture, applying the reaction mixture to a reinforcing material and curing the reaction mixture, where the isocyanates (a) have a viscosity of not more than 500 mPas at 25° C. and the compounds (b) having groups which are reactive toward isocyanates comprise a polyetherol (b1) having a functionality of 4 or more and a viscosity at 25° C. of 10 000 mPas or less, a polyetherol (b2) having a functionality of 3.5 or less and a viscosity at 25° C. of 600 mPas or less, a polyesterol (b3) having a viscosity at 25° C. of 2000 mPas or less, chain extenders (b4) comprising at least 30% secondary OH groups and optionally a crosslinker (b5).

As isocyanates (a), it is possible to use all usual aliphatic, cycloaliphatic and preferably aromatic diisocyanates and/or polyisocyanates which have a viscosity of less than 600 mPas, preferably less than 500 mPas and particularly preferably less than 350 mPas, measured at 25° C. Particular preference is given to tolylene diisocyanate (TDI) and diphenylmethane diisocyanate (MDI) and in particular mixtures of diphenylmethane diisocyanate and polymeric diphenylmethane diisocyanate (PMDI) as isocyanates. These particularly preferred isocyanates can have been entirely or partially modified with uretdione, carbamate, isocyanurate, carbodiimide, allophanate and preferably urethane groups.

Furthermore, prepolymers and mixtures of the above-described isocyanates and prepolymers can be used as isocyanate component. These prepolymers are prepared from the above-described isocyanates and the polyethers, polyesters or both described below and have an NCO content of from 14 to 32% by weight, preferably from 22 to 30% by weight.

As compounds (b) having groups which are reactive toward isocyanates, it is possible to use all compounds which have at least two groups which are reactive toward isocyanates, e.g. OH-, SH-, NH- and CH-acidic groups. It is usual to use polyetherols and/or polyesterols having from 2 to 8 hydrogen atoms which are reactive toward isocyanate. The OH number of these compounds is usually in the range from 30 to 850 mg KOH/g, preferably in the range from 80 to 600 mg KOH/g.

The polyetherols are obtained by known methods, for example by anionic polymerization of alkylene oxides with addition of at least one starter molecule which comprises from 2 to 8, preferably from 2 to 6, reactive hydrogen atoms in bound form in the presence of catalysts. As catalysts, it is possible to use alkali metal hydroxides such as sodium or potassium hydroxide or alkali metal alkoxides such as sodium methoxide, sodium or potassium ethoxide or potassium isopropoxide or, in the case of cationic polymerization, Lewis acids such as antimony pentachloride, boron trifluoride etherate or bleaching earth as catalysts. Furthermore, double metal cyanide compounds, known as DMC catalysts, can also be used as catalysts.

As alkylene oxides, preference is given to using one or more compounds having from 2 to 4 carbon atoms in the alkylene radical, e.g. tetrahydrofuran, 1,3-propylene oxide, 1,2- or 2,3-butylene oxide, in each case either alone or in the form of mixtures, and preferably ethylene oxide and/or 1,2-propylene oxide.

Possible starter molecules are, for example, ethylene glycol, diethylene glycol, glycerol, trimethylolpropane, pentaerythritol, sugar derivatives such as sucrose, hexitol derivatives such as sorbitol, methylamine, ethylamine, isopropylamine, butylamine, benzylamine, aniline, toluidine, toluenediamine, naphthylamine, ethylenediamine, diethylenetriamine, 4,4'-methylenedianiline, 1,3-propanediamine, 1,6-hexanediamine, ethanolamine, diethanolamine, triethanolamine and other dihydric or polyhydric alcohols or monofunctional or polyfunctional amines.

The polyester alcohols used are usually prepared by condensation of polyfunctional alcohols having from 2 to 12 carbon atoms, e.g. ethylene glycol, diethylene glycol, butanediol, trimethylolpropane, glycerol or pentaerythritol, with polyfunctional carboxylic acids having from 2 to 12 carbon atoms, for example succinic acid, glutaric acid, adipic acid, suberic acid, azelaic acid, sebacic acid, decanedicarboxylic acid, maleic acid, fumaric acid, phthalic acid, isophthalic acid, terephthalic acid, the isomers of naphthalenedicarboxylic acids or the anhydrides of the acids mentioned.

As further starting materials in the preparation of the polyesters, it is also possible to make concomitant use of hydrophobic materials. The hydrophobic materials are water-insoluble materials comprising a nonpolar organic radical and also having at least one reactive group selected from among hydroxyl, carboxylic acid, carboxylic ester and mixtures thereof. The equivalent weight of the hydrophobic materials is preferably in the range from 130 to 1000 g/mol. It is possible to use, for example, fatty acids such as stearic acid, oleic acid, palmitic acid, lauric acid or linoleic acid and also fats and oils such as castor oil, maize oil, sunflower oil, soybean oil, coconut oil, olive oil or tall oil. If polyesters comprise hydrophobic materials, the proportion of the hydrophobic materials based on the total monomer content of the polyester alcohol is preferably from 1 to 30 mol %, particularly preferably from 4 to 15 mol %.

The polyesterols used preferably have a functionality of from 1.5 to 5, particularly preferably 1.8-3.5 and in particular from 1.9 to 2.2.

The compound (b) having groups which are reactive toward isocyanates further comprises chain extenders and/or crosslinkers. As chain extenders and/or crosslinkers, use is made of, in particular, bifunctional or trifunctional amines and alcohols, in particular diols, triols or both, in each case having molecular weights of less than 350, preferably from 60 to 300 and in particular from 60 to 250. Here, bifunctional compounds are referred to as chain extenders and trifunctional or higher-functional compounds are referred to as crosslinkers. It is possible to use, for example, aliphatic, cycloaliphatic and/or aromatic diols having from 2 to 14, preferably from 2 to 10, carbon atoms, e.g. ethylene glycol, 1,2-, 1,3-propanediol, 1,2-, 1,3-pentanediol, 1,10-decanediol, 1,2-, 1,3-, 1,4-dihydroxycyclohexane, diethylene glycol and triethylene glycol, dipropylene glycol and tripropylene glycol, 1,4-butanediol, 1,6-hexanediol and bis(2-hydroxyethyl)hydroquinone, triols such as 1,2,4-, 1,3,5-trihydroxycyclohexane, glycerol and trimethylolpropane and low molecular weight hydroxyl-comprising polyalkylene oxides based on ethylene oxide and/or 1,2-propylene oxide and the abovementioned diols and/or triols as starter molecules.

It is important for the invention that the compounds (b) having groups which are reactive toward isocyanates comprise a polyetherol (b1) having a functionality of 4 or more and a viscosity at 25° C. of 10 000 mPas or less, a polyetherol (b2) having a functionality of 3.5 or less, preferably 3 or less, and a viscosity at 25° C. of 600 mPas or less, preferably 500 mPas or less, a polyesterol (b3) having a viscosity at 25° C. of 2000 mPas or less, a chain extender (b4) and optionally a crosslinker (b5). As components (b1) to (b5), it is possible to use, in each case, individual compounds or mixtures, with each of the compounds used coming under the definition of (b1) to (b5).

The chain extender (b4) has on average at least 30%, preferably at least 40%, particularly preferably at least 50% and in particular at least 60%, secondary OH groups. The chain extender (b4) can be an individual compound or a mixture. The chain extender (b4) preferably comprises dipropylene glycol, tripropylene glycol and/or 2,3-butanediol either alone or optionally in mixtures with one another or with further chain extenders. Thus, in a particularly preferred embodiment, dipropylene glycol is used together with a second chain extender, for example 2,3-butanediol, mono-propylene glycol or diethylene glycol, as chain extender (b4).

In a further embodiment, the compounds (b) having groups which are reactive toward isocyanates comprise a crosslinker (b5) in addition to the polyetherol (b1), the polyetherol (b2), the polyesterol (b3) and the chain extender (b4). As crosslinkers, preference is given to using 1,2,4-, 1,3,5-trihydroxycyclohexane, glycerol and/or trimethylolpropane. Preference is given to using glycerol as crosslinker.

The proportion of the component (b1) is preferably from 25 to 70% by weight, particularly preferably from 25 to 55% by weight and in particular from 30 to 50% by weight, based on the total weight of the component (b).

The proportion of the component (b2) is preferably from 10 to 40% by weight, particularly preferably from 15 to 35% by weight, based on the total weight of the component (b).

The proportion of the component (b3) is preferably from 15 to 50% by weight, particularly preferably from 20 to 40% by weight, based on the total weight of the component (b).

The proportion of chain extender (b4) in the component (b) is preferably from 1 to 30% by weight, particularly preferably from 5 to 20% by weight, based on the total weight of the component (b).

The proportion of the component (b5) in the component (b) is preferably from 0 to 10% by weight, particularly preferably from 1 to 5% by weight, based on the total weight of the component (b).

The proportion of the polyetherols (b1), (b2), (b3), (b4) and optionally (b5) in the compound (b) having groups which are reactive toward isocyanates is preferably at least 80% by weight, particularly preferably at least 90% by weight and in particular 100% by weight, based on the total weight of the compound (b) having groups which are reactive toward isocyanates.

The total functionality of the component (b) is preferably greater than 2.5, particularly preferably greater than 2.6 and in particular greater than 2.75. The average OH number of the component (b) is preferably greater than 300 mg KOH/g, particularly preferably in the range from 320 to 1000 mg KOH/g and in particular in the range from 340 to 600 mg KOH/g.

If isocyanate prepolymers are used as isocyanates (a), the content of compounds (b) having groups which are reactive toward isocyanates is calculated with inclusion of the compounds (b) having groups which are reactive toward isocyanates which are used for preparing the isocyanate prepolymers.

As blowing agents (c), blowing agents comprising water are used. Here, water can be used either alone or in combination with further blowing agents. The water content of the blowing agent (c) is preferably greater than 40% by weight, particularly preferably greater than 60% by weight and very particularly preferably greater than 80% by weight, based on the total weight of the blowing agent (c). In particular, water is used as sole blowing agent. If further blowing agents are used in addition to water, it is possible to use, for example, chlorofluorocarbons, fluorinated hydrocarbons, hydrocarbons, acids and liquid or dissolved carbon dioxide. Blowing agents (c) preferably comprise less than 50% by weight, more preferably less than 20% by weight, particularly preferably less than 10% by weight and in particular 0% by weight, based on the total weight of the blowing agent (c), of chlorofluorocarbons, fluorinated hydrocarbons and/or hydrocarbons. In a further embodiment, a mixture of water and formic acid and/or carbon dioxide can be used as blowing agent (c). To be able to disperse the blowing agent in the polyol component more easily, the blowing agent (c) can be mixed with polar compounds such as dipropylene glycol.

The blowing agents (c) are used in such an amount that the density of the rigid polyurethane foam formed by reaction of the components (a) to (e) is, without taking into account the reinforcing material, in the range 50-200 g/l, preferably 80-120 g/l.

As catalysts (d), it is possible to use all compounds which accelerate the isocyanate-water reaction or the isocyanate-polyol reaction. Such compounds are known and are described, for example, in "Kunststoffhandbuch, volume 7, Polyurethane", Carl Hanser Verlag, 3rd edition 1993, chapter 3.4.1. These comprise amine-based catalysts and catalysts based on organic metal compounds.

As catalysts based on organic metal compounds, it is possible to use, for example, organic tin compounds such as tin(II) salts of organic carboxylic acids, e.g. tin(II) acetate, tin(II) octoate, tin(II) ethylhexanoate and tin(II) laurate, and the dialkyltin(IV) salts of organic carboxylic acids, e.g. dibutyltin diacetate, dibutyltin dilaurate, dibutyltin maleate and dioctyltin diacetate, and also bismuth carboxylates e.g. bismuth(III) neodecanoate, bismuth 2-ethylhexanoate and bismuth octanoate, or alkali metal salts of carboxylic acids, e.g. potassium acetate or potassium formate.

Preference is given to using a mixture comprising at least one tertiary amine as catalyst (d). These tertiary amines are usually compounds which can also bear groups which are reactive toward isocyanate, e.g. OH, NH or $NH_2$ groups. Some of the most frequently used catalysts are bis(2-dimethylaminoethyl)ether, N,N,N,N,N-pentamethyldiethylenetriamine, N,N,N-triethylaminoethoxyethanol, dimethylcyclohexylamine, dimethylbenzylamine, triethylamine, triethylenediamine, pentamethyldipropylenetriamine, dimethylethanolamine, N-methylimidazole, N-ethylimidazole, tetramethylhexamethylenediamine, tris(dimethylaminopropyl)hexahydrotriazine, dimethylaminopropylamine, N-ethylmorpholine, diazabicycloundecene and diazabicyclononene. Preference is given to using mixtures comprising at least two different tertiary amines as catalysts (d). The catalyst mixture (d) particularly preferably comprises dimethylcyclohexylamine (d1) and a bicyclic amine (d2) or dimethylcyclohexylamine (d1) and a monocyclic amine (d3). The ratio of dimethylcyclohexylamine (d1) and bicyclic amine (d2) or dimethylcyclohexylamine (d1) and monocyclic amine (d3) is preferably 0.2-4:1, particularly preferably 0.5-1.5:1. The cyclic amines d2) and d3) are preferably selected from among the abovementioned cyclic amines.

The proportion of dimethylcyclohexylamine (d1), bicyclic amine (d2) and monocyclic amine (d3) in the catalyst mixture (d) is preferably at least 80% by weight, particularly preferably at least 90% by weight and in particular 100% by weight, based on the total weight of the catalysts (d).

As reinforcing material, it is possible to use all materials which give the rigid polyurethane foam an even greater mechanical stability. Such reinforcing materials are, for example, glass fibers, glass fiber mats or carbon fiber mats, preferably glass fiber mats, for example Unifilio® U801 or U809 from Owens Corning Vetrotex. The proportion of reinforcing material is preferably from 5 to 15 percent by weight, based on the total weight of the rigid polyurethane foam including reinforcing material.

As further additives (e), it is possible to use flame retardants, plasticizers, foam stabilizers, further fillers and other additives such as antioxidants. Preference is given to using at least flame retardants or plasticizers.

As flame retardants, the flame retardants known from the prior art can generally be used. Suitable flame retardants are, for example, brominated ethers (Ixol B 251), brominated alcohols such as dibromoneopentyl alcohol, tribromoneopentyl alcohol and PHT-4-diol, and also chlorinated phosphates such as tris(2-chloroethyl)phosphate, tris(2-chloroisopropyl) phosphate (TCPP), tris(1,3-dichloroisopropyl)phosphate, tris(2,3-dibromopropyl)phosphate and tetrakis(2-chloroethyl)ethylenediphosphate, or mixtures thereof.

Apart from the abovementioned halogen-substituted phosphates, it is also possible to use inorganic flame retardants such as red phosphorus, preparations comprising red phosphorus, expandable graphite, aluminum oxide hydrate, antimony trioxide, arsenic oxide, ammonium polyphosphate and calcium sulfate or cyanuric acid derivatives such as melamine or mixtures of at least two flame retardants such as ammonium polyphosphates and melamine and also optionally starch for making the rigid polyurethane foams produced according to the invention flame resistant.

As further liquid halogen-free flame retardants, it is possible to use diethyl ethanephosphonate (DEEP), triethyl phosphate (TEP), dimethyl propylphosphonate (DMPP), diphenyl cresyl phosphate (DPC) and others.

For the purposes of the present invention, the flame retardants are preferably used in an amount of from 0 to 25% based on the total weight of the components (b) to (e).

As plasticizers, mention may be made by way of example of esters of polybasic, preferably dibasic, carboxylic acids with monohydric alcohols. The acid component of such esters can, for example, be derived from succinic acid, isophthalic acid, terephthalic acid, trimellitic acid, citric acid, phthalic anhydride, tetrahydrophthalic and/or hexahydrophthalic anhydride, endomethylenetetrahydrophthalic anhydride, glutaric anhydride, maleic anhydride, fumaric acid and/or dimeric and/or trimeric fatty acids such as oleic acid, optionally in admixture with monomeric fatty acids. The alcohol component of such esters can, for example, be derived from branched and/or unbranched aliphatic alcohols having from 1 to 20 carbon atoms, e.g. methanol, ethanol, propanol, isopropanol, n-butanol, sec-butanol, tert-butanol, the various isomers of pentyl alcohol, of hexyl alcohol, of octyl alcohol (e.g. 2-ethylhexanol), of nonyl alcohol, of decyl alcohol, of lauryl alcohol, of myristyl alcohol, of cetyl alcohol, of stearyl alcohol and/or of fatty and wax alcohols which occur naturally or can be obtained by hydrogenation of naturally occurring carboxylic acids. Possible alcohol components also include cycloaliphatic and/or aromatic hydroxy compounds, for example cyclohexanol and its homologues, phenol, cresol, thymol, carvacrol, benzyl alcohol and/or phenylethanol. Esters of monobasic carboxylic acids with divalent alcohols such as Texanol ester alcohols, for example 2,2,4-trimethyl-1,3-pentanediol diisobutyrate (TXIB) or 2,2,4-trimethyl-1,3-pentanediol dibenzoate; diesters of oligoalkylene glycols and alkylcarboxylic acids, for example triethylene glycol dihexanoate or tetraethylene glycol diheptanoate and analogous compounds, can also be used as plasticizers.

Additional possible plasticizers are esters of the above-mentioned alcohols with phosphoric acid. Phosphoric esters of halogenated alcohols, e.g. trichloroethyl phosphate, can optionally also be used. In the latter case, a flame-retardant effect can be achieved together with the plasticizing effect. Of course, it is also possible to use mixed esters of the above-mentioned alcohols and carboxylic acids.

The plasticizers can also be polymeric plasticizers, e.g. polyesters of adipic, sebacic and/or phthalic acid.

Furthermore, alkylsulfonic esters of phenol, e.g. phenyl paraffinsulfonate, and aromatic sulfonamides, e.g. ethyltoluene sulfonamide, can also be used as plasticizers. Polyethers, for example triethylene glycol dimethyl ether, can also be used as plasticizers.

The plasticizer is preferably used in an amount of from 0.1 to 15% by weight, particularly preferably from 0.5 to 10% by weight, based on the total weight of the components b) to e). The addition of plasticizer enables the mechanical properties of the rigid polyurethane foam to be improved further, in particular at low temperatures.

The term foam stabilizers refers to materials which promote formation of a regular cell structure during foam formation. Examples which may be mentioned are: silicone-comprising foam stabilizers such as siloxane-oxyalkylene copolymers and other organopolysiloxanes. Alkoxylation products of fatty alcohols, oxo alcohols, fatty amines, alkylphenols, dialkylphenols, alkylcresols, alkylresorcinol, naphthol, alkylnaphthol, naphthylamine, aniline, alkylaniline, toluidine, bisphenol A, alkylated bisphenol A, polyvinyl alcohol and also further alkoxylation products of condensation products of formaldehyde and alkylphenols, formaldehyde and dialkylphenols, formaldehyde and alkylcresols, formaldehyde and alkylresorcinol, formaldehyde and aniline, formaldehyde and toluidine, formaldehyde and naphthol, formaldehyde and alkylnaphthol and also formaldehyde and bisphenol A or mixtures of two or more of these foam stabilizers can also be used.

Foam stabilizers are preferably used in an amount of from 0.5 to 4% by weight, particularly preferably from 1 to 3% by weight, based on the total weight of the components (b) to (e).

Further fillers, in particular reinforcing fillers, are the known, customary organic and inorganic fillers, reinforcing materials, etc. Specific examples which may be mentioned are: inorganic fillers such as siliceous minerals, for example sheet silicates such as antigorite, serpentine, hornblendes, amphiboles, chrisotile, talc; metal oxides such as kaolin, aluminum oxides, titanium oxides and iron oxides, metal salts such as chalk, barite and inorganic pigments such as cadmium sulfide, zinc sulfide and also glass and others. Preference is given to using kaolin (China clay), aluminum silicate and co-precipitates of barium sulfate and aluminum silicate and also natural and synthetic fibrous minerals such as wollastonite, metal fibers and in particular glass fibers of various lengths which may optionally be coated with a size. It is also possible to use hollow glass microspheres. Possible organic fillers are, for example: carbon, melamine, rosin, cyclopentadienyl resins and graft polymers and also cellulose fibers, polyamide, polyacrylonitrile, polyurethane and polyester fibers based on aromatic and/or aliphatic dicarboxylic esters and in particular carbon fibers.

The inorganic and organic fillers can be used either individually or as mixtures and are advantageously incorporated into the reaction mixture in amounts of from 0.5 to 30% by weight, preferably from 1 to 15% by weight, based on the weight of the components (a) to (e).

The invention further provides an insulating material for liquefied natural gas tanks, in particular for liquefied natural gas tanks on board ships, which comprises a rigid polyurethane foam according to the invention.

The rigid polyurethane foam of the invention is preferably produced continuously on a belt. For this purpose, the components (b) to (d) and optionally (e) are preferably mixed to form a polyol component. These are subsequently mixed with the isocyanate component (a), preferably in a low-pressure mixing apparatus, a high-pressure mixing apparatus at a reduced pressure of less than 100 bar or a high-pressure machine. As an alternative, the components (a) to (d) and optionally (e) can also each be introduced individually into the mixing apparatus. The reaction mixture obtained in this way is subsequently placed on the reinforcing material, preferably the glass fiber mats, which are preferably continuously rolled off from a plurality of drums (for example 4-10, preferably 5, 6 or 7) onto the belt and there form an appropriate number of layers. The foam obtained is then preferably cured on the belt to such an extent that it can be cut into pieces without damage. This can be carried out at elevated temperatures, for example during passage through an oven. The foam pieces obtained are then preferably stored further in order to attain full mechanical strength.

The rigid polyurethane foam obtained is subsequently processed further to produce insulation panels. For this purpose, the pieces of the rigid polyurethane foam of the invention which are obtained are cut to size and preferably adhesively bonded to plywood sheets and resin-impregnated glass fiber mats. These polyurethane foam elements are then provided with further auxiliaries such as iron plates, screws and threads in order to produce the finished insulation elements which are then used directly in the production of the insulation barrier of the liquefied natural gas tank. A detailed description of the production of such insulation panels may be found, for example, on the home page of the companies Finetec and Kangrim (Korea).

Isocyanates (a) and compounds (b) having groups which are reactive toward isocyanate, blowing agents comprising water (c), catalysts (d) and optionally further additives (e) are preferably reacted in such amounts that the isocyanate index is in the range from 100 to 400, preferably 100-200, particularly preferably 100-150.

Here, the isocyanate index is, for the purposes of the present invention, the stoichiometric ratio of isocyanate groups to groups which are reactive toward isocyanate multiplied by 100. Groups which are reactive toward isocyanate are in this case all isocyanate-reactive groups comprised in the reaction mixture, including chemical blowing agents but not the isocyanate group itself.

It is particularly advantageous for the reaction mixtures according to the invention to penetrate quickly into the reinforcing materials and thus promote uniform distribution of the reinforcing materials in the resulting rigid polyurethane foam. The long cream time of the reaction mixtures according to the invention combined with a short reaction time is likewise advantageous.

Rigid polyurethane foams according to the invention are preferably used for insulation purposes. Rigid polyurethane foams according to the invention are particularly preferably used for the insulation of liquefied natural gas tanks, in particular on board ships (LNG carriers). They are mechanically stable, have a low thermal conductivity, display excellent foam properties, for example without holes or cracks, have good mechanical properties such as shear strengths, compressive strengths and an excellent Young's modulus, all even at low temperatures, and have a uniform distribution of the layers of reinforcing materials. Mixtures of chain extenders (b4) according to the invention in particular lead to significantly improved shear strengths. The compressive strength and the Young's modulus are measured both perpendicular to and parallel to the foaming direction (in x/y and z direction) in accordance with DIN 53421/DIN EN ISO 604. The shear strength is determined on test specimens having dimensions of 170 mm×35 mm×17 mm in accordance with DIN 53427 at 25° C. or −80° C. and an extension rate of 1 mm/min perpendicular to the foaming direction (in the x/y direction).

The advantages of the invention are illustrated by the following examples.

EXAMPLES

To produce the rigid polyurethane foams according to the invention as per examples 1 to 6 and the foams as per comparative examples C1 to C4, the polyols used were stirred with catalysts, stabilizer and blowing agent as shown in table 1, subsequently mixed with the isocyanate and foamed to give the rigid polyurethane foam. The fiber time was in each case set to 540 seconds by adapting the amount of catalyst. A constant foam density of 100 g/l was set by means of the blowing agent. The isocyanate index was in each case 120. The examples are intended to demonstrate the effect of the polyol mixture according to the invention on the properties of the foam and the foams were produced without reinforcing material for practical reasons.

Rigid polyurethane foams having the dimensions 225 mm×225 mm×225 mm were produced in a mold. After curing, the test specimens were sawn from this cube in order to determine the shear strength, the compressive strength and the Young's modulus in accordance with the standards indicated.

Compressive strength and Young's modulus were measured averaged over three dimensions in accordance with DIN 53421/DIN EN ISO 604. The shear strength was determined on test specimens having dimensions of 170 mm×35 mm×17 mm in accordance with DIN 53427 at 25° C. or −80° C. and an extension rate of 1 mm/minute perpendicular to the foaming direction (in x/y direction).

The composition of the reaction mixture for producing the rigid polyurethane foams as per examples 1 to 6 and comparative examples C1 to C4 and their mechanical properties are shown in table 1.

TABLE 1

| | Example | | | | | | | | | |
|---|---|---|---|---|---|---|---|---|---|---|
| | 1 | 2 | 3 | 4 | 5 | 6 | C1 | C2 | C3 | C4 |
| Polyol 1 | 40 | 50 | 50 | 40 | 35 | 33 | 50 | 50 | 50 | 40 |
| Polyol 2 | 25 | 15 | 25 | 25 | 25 | 25 | 25 | 50 | 40 | 25 |
| Polyol 3 | 25 | 25 | 15 | 25 | 25 | 25 | 25 | | | 25 |
| Dipropylene glycol | 10 | 10 | 10 | | 7.5 | 7.5 | | | 10 | |
| 2,3-Butanediol | | | | 10 | 7.5 | 7.5 | | | | |
| Diethylene glycol | | | | | | | | | | 10 |
| Blowing agent | 1.0 | 1.0 | 1.1 | 1.2 | 1.1 | 1.0 | 1.0 | 1.1 | 1.4 | 1.1 |
| Catalyst | 0.8 | 0.75 | 0.8 | 1.0 | 0.75 | 0.95 | 0.95 | 1.1 | 0.6 | 0.8 |
| Plasticizer | | | | | | 2 | | | | |
| Stabilizer | 1.5 | 1.5 | 1.5 | 1.5 | 1.5 | 1.5 | 1.5 | 1.5 | 1.5 | 1.5 |
| Isocyanate | 126 | 137 | 133 | 137 | 140 | 136 | 116 | 104 | 130 | 133 |
| Density [g/l] | 100 | 100 | 100 | 100 | 100 | 100 | 100 | 100 | 100 | 100 |
| Shear strength at 25° C. [MPa] | 0.83 | 0.84 | 0.85 | 0.78 | 0.84 | 0.85 | 0.79 | 0.71 | 0.69 | 0.70 |
| Shear strength at −80° C. [MPa] | 1.06 | | | | | 0.93 | 0.83 | 0.78 | | |
| Compressive strength [N/mm$^2$] | 0.91 | 0.96 | 0.92 | 0.95 | 0.90 | 0.97 | 0.84 | 0.70 | 0.89 | 0.84 |
| Young's modulus [N/mm$^2$] | 24.8 | 24.5 | 23.5 | 24.3 | 23.7 | 25.9 | 22.5 | 18.3 | 25.9 | 22.7 |

The following starting materials were used:

Polyol 1: sugar-based, coinitiated polyetherol, functionality=4.4, OH number=500 mg KOH/g, viscosity=8000 mPas Polyol 2: propylene glycol-based polyetherol, functionality=2, OH number=100 mg KOH/g, viscosity=150 mPas Polyol 3: polyesterol based on phthalic anhydride/diethylene glycol, functionality=2, OHN=300 mg KOH/g, viscosity=1000 mPas Isocyanate: polymeric methylenedi(phenyl diisocyanate, (PMDI), viscosity=200 mPas, (Lupranat M 20 S from BASF AG)

(the viscosity figures in each case relate to the viscosity at 25° C.)

Stabilizer: silicone-comprising foam stabilizer

Catalyst: dimethylcyclohexylamine, 10% strength by weight solution in polyol 2

Blowing agent: water

Plasticizer: dialkyl dicarboxylate

Table 1 shows that rigid polyurethane foams according to the invention have high shear strengths and also high compressive strengths and a high Young's modulus. The additional use of plasticizers produces a further improvement in individual foam properties.

The invention claimed is:

1. A rigid polyurethane foam obtained by mixing
   (a) isocyanates,
   (b) compounds having groups which are reactive toward isocyanates,
   (c) a blowing agent, wherein water is the sole blowing agent,
   (d) catalysts and optionally
   (e) further additives
   to form a reaction mixture, applying the reaction mixture to a reinforcing material and curing the reaction mixture,
   wherein the isocyanates (a) have a viscosity of not more than 500 mPas at 25° C. and
   the compounds (b) having groups which are reactive toward isocyanates comprise a polyetherol (b1) having a functionality of 4 or more and a viscosity at 25° C. of 10 000 mPas or less, a polyetherol (b2) having a functionality of 3.5 or less and a viscosity at 25° C. of 600 mPas or less, a polyesterol (b3) having a viscosity at 25° C. of 2000 mPas or less, chain extenders (b4) comprising at least 30% secondary OH groups and optionally a crosslinker (b5).

2. The rigid polyurethane foam according to claim 1, wherein the chain extender (b4) comprises 2,3-butanediol, monopropylene glycol, dipropylene glycol and/or tripropylene glycol.

3. The rigid polyurethane foam according to claim 1, wherein the chain extender (b4) comprises dipropylene glycol together with a second chain extender, for example 2,3-butanediol, monopropylene glycol or diethylene glycol.

4. The rigid polyurethane foam according to claim 1, wherein the proportion of the polyetherol (b1) is from 30 to 60% by weight and that of the chain extender (b4) is from 2 to 30% by weight, in each case based on the total weight of the polyol mixture b).

5. The rigid polyurethane foam according to claim 1, wherein the proportion of the polyetherols (b1), (b2), (b3), (b4) and optionally (b5) in the compound (b) having groups which are reactive toward isocyanates is 100% by weight, based on the total weight of the compound (b) having groups which are reactive toward isocyanates.

6. The rigid polyurethane foam according to claim 1, wherein the average density of the polyurethane foam without reinforcing material is in the range 50-200 g/l.

7. The rigid polyurethane foam according to claim 1, wherein a catalyst mixture comprising tertiary amines is used as catalysts d).

8. The rigid polyurethane foam according to claim 1, wherein the reinforcing material is glass fiber mats and the reinforcing material is used in an amount of from 5 to 15 percent by weight, based on the total weight of the rigid polyurethane foam including reinforcing material.

9. The rigid polyurethane foam according to claim 1, wherein the further additives e) comprise plasticizers.

10. A process for producing a rigid polyurethane foam, which comprises mixing
    (a) isocyanates with
    (b) compounds having groups which are reactive toward isocyanates,
    (c) a blowing agent, wherein water is the sole blowing agent,
    (d) a catalyst mixture comprising tertiary amines and optionally
    (e) further additives
    to form a reaction mixture, applying the reaction mixture to a reinforcing material and curing the reaction mixture to form the polyurethane foam, wherein
    the isocyanates (a) have a viscosity of not more than 500 mPas at 25° C. and
    the compounds (b) having groups which are reactive toward isocyanates comprise a polyetherol (b1) having a functionality of 4 or more and a viscosity at 25° C. of 10 000 mPas or less, a polyetherol (b2) having a functionality of 3.5 or less and a viscosity at 25° C. of 600 mPas or less, a polyesterol (b3) having a viscosity at 25° C. of 2000 mPas or less, chain extenders (b4) comprising at least 30% secondary OH groups and optionally a crosslinker (b5).

11. An insulating material for liquefied natural gas tanks, which comprises a rigid polyurethane foam according to claim 1.

12. An insulated liquefied natural gas tank comprising an insulation layer of the rigid polyurethane foam according to claim 1.

13. The rigid polyurethane foam according to claim 1, wherein the polyetherol (b1) is present in an amount of from 25 to 70% by based on the total weight of the component (b).

14. The rigid polyurethane foam according to claim 1, wherein the average density of the polyurethane foam without reinforcing material is in the range 80-120 g/l.

15. The rigid polyurethane foam according to claim 1, further comprising a dialkyl dicarboxylate plasticizer.

16. The rigid polyurethane foam according to claim 1, further comprising a silicone stabilizer.

17. The rigid polyurethane foam according to claim 1, wherein the catalyst comprises dimethylcyclohexylamine.

18. The rigid polyurethane foam according to claim 1, having a compressive strength in accordance with DIN 53421/DIN EN ISO 604 of from 0.91 to 0.97 N/mm$^2$.

19. The rigid polyurethane foam according to claim 1, having a shear strength at 25° C. in accordance with DIN 53427 of from 0.83 to 0.85 MPa.

* * * * *